United States Patent
Jeon et al.

(10) Patent No.: US 10,517,017 B2
(45) Date of Patent: Dec. 24, 2019

(54) APPARATUS AND METHOD FOR LOAD BALANCING IN MULTI-CELL WIRELESS ACCESS SYSTEM

(75) Inventors: Joseph Jeon, Seongnam-si (KR); Ki-Young Han, Yongin-si (KR); Byoung-Ha Yi, Seoul (KR); Hyon-Seung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 13/299,316

(22) Filed: Nov. 17, 2011

(65) Prior Publication Data

US 2012/0120806 A1    May 17, 2012

(30) Foreign Application Priority Data

Nov. 17, 2010    (KR) .................. 10-2010-0114250

(51) Int. Cl.
| | |
|---|---|
| H04W 28/08 | (2009.01) |
| H04W 52/40 | (2009.01) |
| H04W 36/22 | (2009.01) |
| H04W 52/34 | (2009.01) |

(52) U.S. Cl.
CPC ........... *H04W 28/08* (2013.01); *H04W 52/40* (2013.01); *H04W 36/22* (2013.01); *H04W 52/343* (2013.01)

(58) Field of Classification Search
CPC ... H04W 28/08; H04W 52/40; H04W 52/343; H04W 36/22
See application file for complete search history.

(56) References Cited

U.S. PATENT DOCUMENTS

| | | | | |
|---|---|---|---|---|
| 5,898,682 | A | * | 4/1999 | Kanai .................. H04W 16/06 370/331 |
| 5,912,884 | A | * | 6/1999 | Park et al. .................... 370/331 |
| 6,542,736 | B1 | * | 4/2003 | Parkvall ............... H04W 28/20 370/465 |
| 2003/0050066 | A1 | * | 3/2003 | Tobe et al. .................... 455/446 |
| 2005/0068916 | A1 | * | 3/2005 | Jacobsen et al. ............. 370/328 |
| 2006/0203778 | A1 | * | 9/2006 | Han .................. H04W 72/1257 370/335 |
| 2009/0005102 | A1 | * | 1/2009 | Das et al. ..................... 455/522 |
| 2009/0069054 | A1 | * | 3/2009 | Zangi ................... H04L 5/0023 455/562.1 |
| 2010/0039976 | A1 | * | 2/2010 | Huschke ...................... 370/312 |

(Continued)

FOREIGN PATENT DOCUMENTS

WO      2009050794 A1    4/2009

OTHER PUBLICATIONS

Berjano, Y., et al., "Cell Breathing Techniques for Load Balancing in Wireless LANs," IEEE Trans. Mobile Comput., vol. 8, No. 6., Jun. 2009, pp. 735-749.

(Continued)

*Primary Examiner* — Chirag G Shah
*Assistant Examiner* — Joshua Smith

(57) ABSTRACT

An apparatus and method provide load balancing in a multi-cell wireless access system. The method includes determining a change value of a TX power, determining a handover candidate set including at least one MS to be handed over, calculating expected gains after TX power control for each MS classification, and determining whether to control the TX power based on the expected gains. The change value is zero or a positive real number.

24 Claims, 10 Drawing Sheets

(56) References Cited

U.S. PATENT DOCUMENTS

| | | | |
|---|---|---|---|
| 2010/0085884 A1* | 4/2010 | Srinivasan et al. | 370/252 |
| 2010/0173644 A1 | 7/2010 | Koyanagi | |
| 2010/0240369 A1* | 9/2010 | Law | H04W 36/30 455/436 |
| 2010/0284345 A1* | 11/2010 | Rudrapatna | H04W 72/082 370/329 |
| 2011/0051684 A1* | 3/2011 | Li | H04W 36/20 370/331 |
| 2012/0282979 A1* | 11/2012 | Ashraf et al. | 455/561 |

OTHER PUBLICATIONS

Kim, D., et al., "Transmit Power Control Mechanism for Load Balancing in Moving Base Stations," Seoul National University and Samsung Electronics, Jun. 23, 2010, 2 pages.

Kim, D., et al., "Transmit Power Control Mechanism for Load Balancing in Moving Base Stations," Seoul National University and Samsung Electronics, Jun. 23, 2010, English Abstract, 1 page.

Foreign Communication From a Related Counterpart Application, Korean Application No. 10-2010-0114250, Notice of Preliminary Rejection dated Jan. 26, 2017, 13 pages.

Notice of Patent Grant for KR10-2010-0114250 dated Jul. 12, 2017, 4 pages.

* cited by examiner

APPARATUS AND METHOD FOR LOAD BALANCING IN MULTI-CELL WIRELESS ACCESS SYSTEM

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Nov. 17, 2010 and assigned Serial No. 10-2010-0114250, the entire disclosure of which is hereby incorporated by reference.

TECHNICAL FIELD OF THE INVENTION

The present invention relates generally to a multi-cell wireless access system, and in particular, to an apparatus and method for inter-cell load balancing in a multi-cell wireless access system.

BACKGROUND OF THE INVENTION

A wireless access system provides a communication service to a user through a wireless channel. The wireless access system includes a plurality of base stations (BSs) communicating with user terminals (e.g., mobile stations (MSs)). The BSs provide wireless access to MSs located in a predetermined range of geographical area that is called a cell. The movement of MSs may change a cell for providing wireless access to each MS. This may also change the number of MSs located in each cell.

A BS provides wireless access to MSs in the BS's own cell, communicates with a core network through a backhaul network, and communicates data with the MSs. Thus, if many MSs access the BS, the amount of traffic may exceed the capacity of the backhaul network as well as the wireless channel of the BS. This may degrade the quality of service.

What is therefore needed is an inter-cell load balancing scheme for preventing an inter-cell load imbalance to maintain the quality of service.

SUMMARY OF THE INVENTION

To address the above-discussed deficiencies of the prior art, it is a primary aspect of the present disclosure to address at least the above mentioned problems and/or disadvantages and to provide at least the advantages described below. Accordingly, an aspect of the present disclosure is to provide an apparatus and method for preventing an inter-cell load imbalance in a multi-cell wireless access system.

Another aspect of the present disclosure is to provide an apparatus and method for controlling the transmission (TX) power of a BS to increase a system data rate in a multi-cell wireless access system.

Another aspect of the present disclosure is to provide an apparatus and method for comparing gains before and after TX power control in a multi-cell wireless access system.

Another aspect of the present disclosure is to provide an apparatus and method for comparing gains before and after a MS handover in a multi-cell wireless access system.

According to an aspect of the present disclosure, a method for loading balancing in a multi-cell wireless access system includes: determining a change value of a TX power, the change value being 0 or a positive real number; determining a handover candidate set including at least one MS to be handed over; calculating expected gains after TX power control for each MS classification; and determining whether to control the TX power based on the expected gains.

According to another aspect of the present disclosure, an apparatus for loading balancing in a multi-cell wireless access system includes: a storage unit for storing state information of BSs and measurement information of MSs necessary for load balancing; and a control unit for determining a change value of a TX power, determining a handover candidate set including at least MS to be handed over, calculating expected gains after TX power control for each MS classification, and determining whether to control the TX power based on the expected gains, wherein the change value is 0 or a positive real number.

According to another aspect of the present disclosure, a method for an operation of an MS in a multi-cell wireless access system includes: determining whether a TX power of a base station (BS) is changed or whether a handover command transmitted from the BS is received, and performing a handover according to a changing the TX power of a BS or the handover command from the BS. Herein the changing the TX power of the BS or the transmitting the handover command is determined based on expected gains that is determined by determining a handover candidate set including at least one MS to be handed over, calculating expected gains after TX power control for each MS classification.

According to another aspect of the present disclosure, An apparatus for an MS in a multi-cell wireless access system includes: a modem configured to determine whether a TX power of a BS is changed or whether a handover command transmitted from the BS is received, and a controller configured to perform a handover according to a changing the TX power of a BS or the handover command from the BS. Herein the changing the TX power of the BS or the transmitting the handover command is determined based on expected gains that is determined by determining a handover candidate set including at least one MS to be handed over, calculating expected gains after TX power control for each MS classification.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present disclosure provides an inter-cell load balancing scheme in a multi-cell wireless access system.

Figure 1:
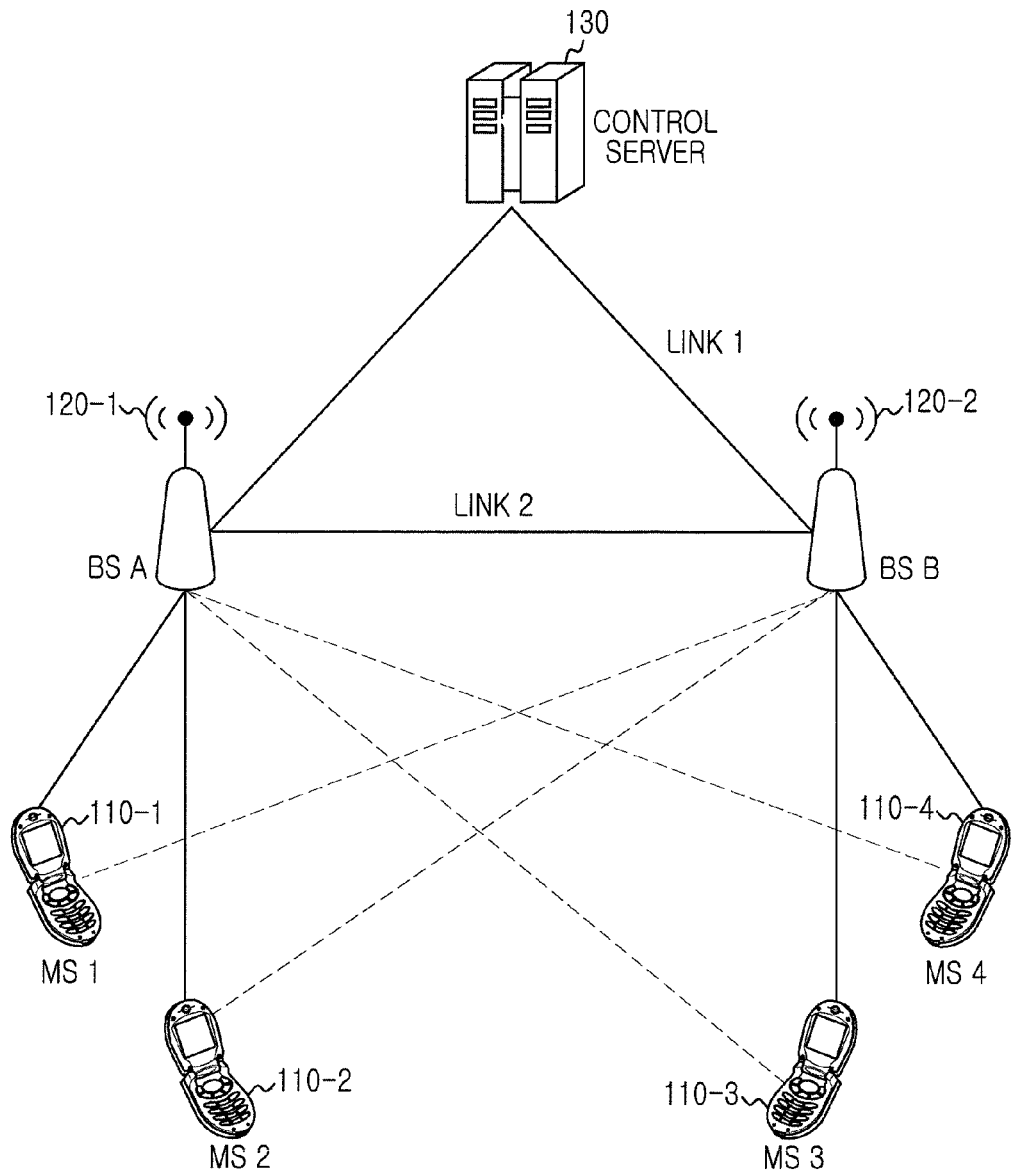
FIG. 1 illustrates a multi-cell wireless access system according to an exemplary embodiment of the present disclosure.

FIG. 1 illustrates a multi-cell wireless access system according to an exemplary embodiment of the present disclosure.

Referring to FIG. 1, a multi-cell wireless access system according to an exemplary embodiment of the present disclosure may include mobile stations (MSs) 110, base stations (BSs) 120, and a control server 130 for controlling inter-BS information.

The MSs 110-1 to 110-4 may have a serving BS and a connection link, and may communicate data with the serving BS through the connection link. Also, the MSs 110-1 to 110-4 may have a measurement link for neighbor BSs, and may measure signals received from the neighbor BSs through the measurement link. According to another exemplary embodiment, the BSs 120-1 and 120-2 may measure signals received from the MSs 110-1 to 110-4 through the measurement link.

The BSs 120-1 and 120-2 may provide wireless access to the MSs 110-1 to 110-4. The BSs 120-1 and 120-2 may communicate information directly through a link 2, or may communicate information through the control server 130.

If the BSs 120-1 and 120-2 are controlled in a centralized manner, the control server 130 may collect data from the BSs 120-1 and 120-2, determine an operation parameter of each BS, and transmit a parameter control command. The control server 130 may be called differently according to the system type. For example, the control server 130 may be called a self organization network (SON) server.

A load balancing process according to an exemplary embodiment of the present disclosure is divided into 1) a process of collecting information between a BS and an MS, and 2) a process of determining a TX power of a BS. The information collecting process and the TX power determining process will be described below in detail.

1) BS Information Collecting Process

Signal strength and quality information from a neighbor BS measured by each MS may be required for a loading balancing process according to an exemplary embodiment of the present disclosure. An MS measures a received signal strength indicator (RSSI) and a received (RX) power of a neighbor BS receiving a signal stronger than a threshold value. The threshold value may vary according to embodiments. For example, the threshold value may be the strength of a thermal noise.

Each BS receives a report of each MS on an RSSI and an RX power of a serving BS and a neighbor BS measured by the MS. The RX power and RSSI measurement period of the MS is shorter than the report period to the BS. Accordingly, a plurality of measurements is performed during one report period. The MS may report the average of a signal measured during the report period. If a new connection or a handover occurs during the report period, the average of measurement values after the new occurrence of a connection is reported. According to another exemplary embodiment, each BS may receive a signal, transmitted by an MS accessing a serving BS and a neighbor BS, and may directly measure an RSSI and an RX power between each MS and the BS.

The RSSI and the RX power, which are reported by the MS or measured by the BS, may be used to determine the TX power for load balancing. The load balancing may be performed in a centralized manner or in a distributed manner. An operation of the BS for processing the information reported by the MS may vary depending on whether the load balancing is performed in a centralized manner or in a distributed manner, A. Centralized Load Balancing: A control server performs all load balancing processes. Each BS reports information reported from an MS, the BS's own current TX power, and the number of MSs connected to the BS reporting the information, to the control server. Herein, the report period of the BS may be equal to the report period of the MS, and the BS may directly transmit the collected MS information.

B. Distributed Load Balancing: A separate control server is not used, and each BS determines the BS's own TX power. In this example, each BS selects n number of neighbor BSs, and provides then neighbor BSs with information for load balancing. The information provided to the neighbor BSs includes MS report information, the current BS TX power, and the number of MSs connected the BS providing the information. The neighbor BSs are selected as follows.

The number n of the selected neighbor BSs satisfies Equation (1) below.

$$N_{ms} \times n^2 \times B < C_{link}(\text{Mbps})$$

$$f(N_{ms}, n) < C_{cpu} \tag{1}$$

where $C_{link}$(Mbps) is the link capacity for inter-BS information communication, $C_{cpu}$ is the operation capacity of a BS, $N_{ms}$ is the number of MSs that can be serviced by the BS at one time, B is the transport data amount for transmission of an RSSI and an RX power measured by an MS, and f( ) is a function for calculating a CPU operation amount.

The n depends on the system. Each BS may select n number of neighbor BSs according to the content of information communicated with a neighbor BS, according to one of the following embodiments. The n neighbor BSs may be selected regardless of the frequency used by each BS. According to an exemplary embodiment, if a BS directly knows the RX signal strength of a neighbor BS, the BS selects n number of neighbor BSs having the strongest RX signal. According to another exemplary embodiment, if a BS knows the RX signal strengths of neighbor BSs through an MS, the BS selects upper MSs having the strongest RX signal received from the BS and selects n number of neighbor BSs having the strongest RX signal among the RX signals from neighbor BSs measured by the upper MSs measuring the strongest RX signal. According to another exemplary embodiment, if a BS knows a TX power and location information of a neighbor BS, the BS estimates an expected RX signal strength of each neighbor BS based on the location information and the TX power according to a path loss model suitable for a relevant region and selects n number of neighbor BSs having the strongest expected RX signal. According to another exemplary embodiment, if a BS acquires only location information of a neighbor BS, the BS selects n number of neighbor BSs that are nearest the BS. According to another exemplary embodiment, if a BS retains only a neighbor list and handover information, the BS selects n number of neighbor BSs that have a high frequency of occurrence of a handover.

2) TX Power Determining Process

When receiving information about the BS TX power, the number of MSs and the MS report, a control server or a BS performs a BS TX power determining process periodically.

In the embodiments of a centralized mode, that is, if the control server determines the TX power, the control server receives information from a BS i, updates the information about the BS i, and determines the TX power of the BS i. Herein, recently-updated neighbor BS information may be used to determine the TX power of the BS i.

In the embodiments of a distributed mode, that is, if each BS determines the BS's own TX power, the BS determines the BS's own TX power before providing MS report information to neighbor BSs. Thus, the BS TX power transmitted from the BS to the neighbor BS includes a controlled TX power value.

An object of the TX power determining process is to satisfy Equation (2) below.

$$\max \sum_{j \in J} \sum_{i \in I_j} U_i^j \tag{2}$$

where j is a BS index, J is a BS set, i is an MS index, $I_j$ is an MS set connected to the BS j, and $U_i^j$ is the proportional fairness (PF) metric (=log {data rate}) of the MS i connected to the BS j.

The TX power control should also satisfies Equation (3) below.

$$\sum_{j \in J} \sum_{i \in I_j(k+1)} \log T_i^j(k+1) > \sum_{j \in J} \sum_{i \in I_j(k)} \log T_i^j(k) \tag{3}$$

where j is a BS index, J is a BS set, i is an MS index, $I_j$ is an MS set connected to the BS j, k is a TX power control point index, and $T_i^j$ is the data rate of the MS i connected to the BS j.

Equation (3) represents a condition that should be satisfied when the $k^{th}$ TX power of a BS is controlled by the $(k+1)^{th}$ TX power. The data rate $T_i^j(k)$ of Equation (3) may be determined according to Equation (4) below.

$$T_i^j(k) = R_j \frac{\varphi(I_j(k))}{I_j(k)} E[t_{i,j}(k)] \tag{4}$$

$$\varphi(y) = \sum_{a=1}^{y} \frac{1}{a}$$

$$t_{i,j}(k) = \frac{G_{ij} P_j(k)}{N_o + \sum_{n \in IF_i} G_{in} P_n(k)}$$

where $T_i^j$ is the data rate of the MS i connected to the BS j, k is a TX power control point index, $R_j$ is the capacity providable by the BS j, $\varphi(y)$ is the multi-user diversity gain of y users, $I_j(k)$ is a MS set connected to the BS j at the $k^{th}$ point, $E[t_{i,j}(k)]$ is the average data rate of the MS i connected to the BS j at the $k^{th}$ point, $t_{i,j}$ is the data rate of the MS i connected to the BS j, $G_{ij}$ is the channel gain between the BS j and the MS i, $P_j$ is the TX power of the BS j, $N_o$ is a noise power, and $IF_i$ is a neighbor BS set interfering with the MS i.

As represented in Equation (4), the average data rate $E[t_{i,j}(k)]$ is a parameter of the data rate $T_i^j(k)$ of Equation (4). Thus, whether to control the TX power may be determined according to whether the control of the TX power $P_j$ of the BS satisfies Equation (3).

In order to satisfy the above object, the TX power is determined as follows. The TX power of a BS may be determined by the control server in a centralized manner or may be determined by the BS in a distributed manner, but the TX power determining process is identical. Thus, hereinafter, a TX power determining unit will be referred to as a load balancing module (LBM). Also, a BS whose TX power is determined will be referred to as a target BS.

The LBM may determine the TX power in the TX power increasing/decreasing/maintaining mode. According to an exemplary embodiment, the LBM may determine the TX power control after selecting one of the increasing/decreasing/maintaining modes according to a load on a relevant BS. If one of the increasing/decreasing/maintaining modes is beforehand selected according to the load, the LBM selects one of the increasing/decreasing/maintaining modes based on the number of MSs accessing the target BS. For example, the LBM averages the number of MSs accessing each BS. If the number of MSs accessing the target BS is larger than or equal to the average value, the LBM determines to decrease the TX power; and if the number of MSs accessing the target BS is smaller than the average value, the LBM determines to increase the TX power. According to another embodiment, the LBM may determine the TX power control for a relatively large gain after considering the TX power controls of the increasing/decreasing/maintaining modes. The gain determination may vary according to embodiments. For example, the gain may be a Proportional Fairness (PF) gain.

The decreasing-mode TX power control is performed as follows.

In order to decrease the TX power of a target BS to distribute the load to neighbor BSs, the LBM determines a required power step for the MS k in the cell of the target BS. For example, the power step may be determined according to Equation (5) below.

$$PS_{req,k} = \begin{Bmatrix} RxP_{kj} - RxP_{km}, & FA_j = FA_m \\ CINR_{kj} - CINR_{km}, & FA_j \neq FA_m \end{Bmatrix} \quad (5)$$

where $PS_{req,k}$ is the required power step of the MS k, $RxP_{kj}$ is the RX signal strength of the MS k from the BS j, $FA_j$ is the frequency index of the BS j, and $CINR_{kj}$ is the channel quality between the MS k and the BS j.

The power step that may be determined according to Equation (5) means the minimum power control value that can satisfy a handover triggering condition for the TX power control of the target BS. The handover triggering condition is satisfied if the RSSI from a neighbor BS experienced by an MS performing a handover by the load balancing metric and the RSSI from a serving BS are smaller than a predetermined reference power step.

The LBM sets the minimum required power step among the required power steps to be a minimum step. If the minimum step is smaller than the predetermined reference power step, the LBM sets the minimum step to be equal to the predetermined reference power step. Also, the LBM sets at least one MS, which has a reference power step smaller than or equal to the minimum step, to be included in a handover candidate set. According to an exemplary embodiment, the minim step may be set to the positive integer (n) multiple of the minimum required power step, and may be set to 0. The minimum step may be a positive real number or 0. The n may be set to maximize a change in the sum of PF metrics. For example, the value n may be set to maximize the difference between both sides of Equation (3). Thus, according to another embodiment, the LBM may increase the value n sequentially within a predetermined range, detect the value n maximizing a change in the sum of PF metrics, and determine the minimum step.

With respect to at least one MS belonging to the handover candidate set, the LBM calculates a gain obtained by a handover of the MS. The gain means a gain of the data rate. For example, the LBM may calculate a gain obtained by at least one MS belonging to the handover candidate set (i.e., an expected gain), according to Equation (6) below.

$$eGain = \sum_{\substack{m \in J \\ m \neq j}} \sum_{i \in I_m(k+1) \& HOcandidateSS} \log T_i^m(k+1) - \sum_{i \in I_j(k) \& HOcandidateSS} \log T_i^j(k) \quad (6)$$

where eGain is an expected gain of the MS belonging to the handover candidate set, J is a BS set, $I_m$ is a MS set connected to the BS m, HOcandidateSS is the handover candidate set, $T_i^m$ is a data rate of the MS i connected to the BS m, and k is a TX power control point index.

With respect to at least one MS not belonging to the handover candidate set, the LBM calculates a gain obtained by a handover of the MS belonging to the handover candidate set. The gain means a gain of the data rate. For example, the LBM may calculate a gain obtained by at least one MS not belonging to the handover candidate set, according to Equation (7) below.

$$gamma = \sum_{\substack{i \in j_m(k+1) \\ i \neq HOcandidateSS}} \log T_i^j(k+1) - \sum_{\substack{i \in I_j(k) \\ i \neq HOcandidateSS}} \log T_i^j(k) \quad (7)$$

where gamma is an expected gain of the MS not belonging to the handover candidate set, J is a BS set, $I_j$ is a MS set connected to the BS j, HOcandidateSS is the handover candidate set, $T_i^j$ is a data rate of the MS i connected to the BS j, and k is a TX power control point index.

With respect to at least one MS connected to a neighbor BS using the same frequency, the LBM calculates a gain obtained by a handover of the MS belonging to the handover candidate set. The gain means a gain of the data rate. For example, the LBM may calculate a gain obtained by at least one MS connected to the neighbor BS set using the same frequency, according to Equation (8) below.

$$eta = \sum_{\substack{m \in J \\ m \neq j \\ FA_m = FA_j}} \sum_{i \in I_m(k+1)} \log T_i^m(k+1) - \sum_{\substack{m \in J \\ m \neq j \\ FA_m = FA_j}} \sum_{i \in I_m(k)} \log T_i^m(k) \quad (8)$$

where eta is an expected gain of the MS connected to the neighbor BS using the same frequency, J is a BS set, $I_m$ is a MS set connected to the BS in, $FA_j$ is the frequency index of the BS j, $T_i^m$ is a data rate of the MS i connected to the BS m, and k is a TX power control point index.

With respect to at least one MS connected to a neighbor BS using a different frequency, the LBM calculates a gain obtained by a handover of the MS belonging to the handover candidate set. The gain means a gain of the data rate. For example, the LBM may calculate a gain obtained by at least one MS connected to the neighbor BS using a different frequency, according to Equation (9) below.

$$beta = \sum_{\substack{m \in J \\ m \neq j \\ FA_m \neq FA_j}} \sum_{i \in I_m(k+1)} \log T_i^m(k+1) - \sum_{\substack{m \in J \\ m \neq j \\ FA_m \neq FA_j}} \sum_{i \in I_m(k)} \log T_i^m(k) \quad (9)$$

where beta is an expected gain of the MS connected to the neighbor BS using a different frequency, J is a BS set, $I_m$ is a MS set connected to the BS m, $FA_j$ is the frequency index of the BS j, $T_i^m$ is a data rate of the MS i connected to the BS m, and k is a TX power control point index.

The gain calculated according to Equations (6) to (9) is an expected gain for a handover of the MS belonging to the handover candidate set. The data rate may be according to Equation (4). For an according to Equation (4), the LBM should know the channel gain between BSs. Therefore, the LBM may preferentially determine the path loss between BSs by using the RSSIs measured by the MS with respect to each BS. Also, in calculating the expected gain, the TX power of the BS is applied according to Equation (10) below.

$$P_j(k+1) = P_j(k) - \text{MinStep} \quad (10)$$

where $P_j$ is the TX power of the BS j, k is a TX power control point index, and MinStep is the minimum step that is the TX power change value.

After calculating the expected gains of the MSs belonging to each range, the LBM uses the calculated expected gains to determine whether to decrease the TX power of the target BS. For example, the LBM selects the mode providing a relatively large gain in terms of the entire system, among the TX power decreasing/maintaining modes. For example, the LBM may determine whether to decrease the TX power according to Equation (11) below.

$$gGain+gamma+eta+beta>0 \qquad (11)$$

where eGain is an expected gain of the MS belonging to the handover candidate set, gamma is an expected gain of the MS not belonging to the handover candidate set, eta is an expected gain of the MS connected to the neighbor BS using the same frequency, and beta is an expected gain of the MS connected to the neighbor BS using a different frequency.

Under the determination condition of Equation (11), the weights of the expected gains are identical. However, according to another exemplary embodiment, the LBM may give a larger weight to a specific expected gain.

The increasing-mode TX power control is performed as follows.

In order to increase the TX power of a target BS to concentrate the load, the LBM determines minimum steps for the decreasing-mode TX power control for each neighbor BS, and determines the minimum value of the minimum steps to be the minimum step for the increasing-mode TX power control. The LBM includes an MS, which has a required power step smaller than the minimum step among the MSs connected to the neighbor BS, in the handover candidate set.

With respect to at least one MS belonging to the handover candidate set, the LBM calculates a gain obtained by a handover of the MS. The gain means a gain of the data rate. For example, the LBM may calculate a gain obtained by at least one MS belonging to the handover candidate set, according to Equation (12) below.

$$eGain = \sum_{i \in I_j(k+1) \& HOcandidateSS} \log T_i^j(k+1) - \sum_{\substack{m \in J \\ m \neq j}} \sum_{i \in I_m(k) \& HOcandidateSS} \log T_i^m(k) \qquad (12)$$

where eGain is an expected gain of the MS belonging to the handover candidate set, J is a BS set, $I_m$ is a MS set connected to the BS m, HOcandidateSS is the handover candidate set, $T_i^m$ is a data rate of the MS i connected to the BS m, and k is a TX power control point index.

With respect to at least one MS not belonging to the handover candidate set among the MSs connected to the target BS, the LBM calculates a gain obtained by a handover of the MS belonging to the handover candidate set. The gain means a gain of the data rate. For example, the LBM may calculate a gain obtained by at least one MS not belonging to the handover candidate set, according to Equation (13) below.

$$gamma = \sum_{\substack{i \in I_m(k+1) \\ i \notin HOcandidateSS}} \log T_i^j(k+1) - \sum_{i \in I_j(k)} \log T_i^j(k) \qquad (13)$$

where gamma is an expected gain of the MS not belonging to the handover candidate set, J is a BS set, $I_j$ is a MS set connected to the BS j, HOcandidateSS is the handover candidate set, $T_i^j$ is a data rate of the MS i connected to the BS j, and k is a TX power control point index.

With respect to at least one MS connected to a neighbor BS using the same frequency, the LBM calculates a gain obtained by a handover of the MS belonging to the handover candidate set. The gain means a gain of the data rate. For example, the LBM may calculate a gain obtained by at least one MS connected to the neighbor BS set using the same frequency, according to Equation (14) below.

$$eta = \sum_{\substack{m \in J \\ m \neq j \\ FA_m = FA_j}} \sum_{\substack{i \in I_m(k+1) \\ i \notin HOcandidateSS}} \log T_i^m(k+1) - \sum_{\substack{m \in J \\ m \neq j \\ FA_m = FA_j}} \sum_{\substack{i \in I_m(k) \\ i \notin HOcandidateSS}} \log T_i^m(k) \qquad (14)$$

where eta is an expected gain of the MS connected to the neighbor BS using the same frequency, J is a BS set, $I_m$ is a MS set connected to the BS m, $FA_j$ is the frequency index of the BS j, $T_i^m$ is a data rate of the MS i connected to the BS m, and k is a TX power control point index.

With respect to at least one MS connected to a neighbor BS using a different frequency, the LBM calculates a gain obtained by a handover of the MS belonging to the handover candidate set. The gain means a gain of the data rate. For example, the LBM may calculate a gain obtained by at least one MS connected to the neighbor BS using a different frequency, according to Equation (15) below.

$$beta = \sum_{\substack{m \in J \\ m \neq j \\ FA_m \neq FA_j}} \sum_{\substack{i \in I_m(k+1) \\ i \notin HOcandidateSS}} \log T_i^m(k+1) - \sum_{\substack{m \in J \\ m \neq j \\ FA_m \neq FA_j}} \sum_{\substack{i \in I_m(k) \\ i \notin HOcandidateSS}} \log T_i^m(k) \qquad (15)$$

where beta is an expected gain of the MS connected to the neighbor BS using a different frequency, J is a BS set, $I_m$ is a MS set connected to the BS in, $FA_j$ is the frequency index of the BS j, $T_i^m$ is a data rate of the MS i connected to the BS m, and k is a TX power control point index.

The gain calculated according to Equations (12) to (15) is an expected gain for a handover of the MS belonging to the handover candidate set. The data rate may be according to Equation (4). For an according to Equation (4), the LBM should know the channel gain between BSs. Therefore, the LBM may preferentially determine the path loss between BSs by using the RSSIs measured by the MS with respect to each BS. Also, in calculating the expected gain, the TX power of the BS is applied according to Equation (16) below.

$$P_j(k+1)=P_j(k)+MinStep \qquad (16)$$

where $P_j$ is the TX power of the BS j, k is a TX power control point index, and MinStep is the minimum step that is the TX power change value.

After calculating the expected gains of the MSs belonging to each range, the LBM uses the calculated expected gains to determine whether to decrease the TX power of the target BS. For example, the LBM selects the mode providing a relatively large gain in terms of the entire system, among the TX power decreasing/maintaining modes. For example, the LBM may determine whether to decrease the TX power according to Equation (11). Under the determination condition of Equation (11), the weights of the expected gains are identical. However, according to another exemplary embodiment, the LBM may give a larger weight to a specific expected gain.

Figure 2:
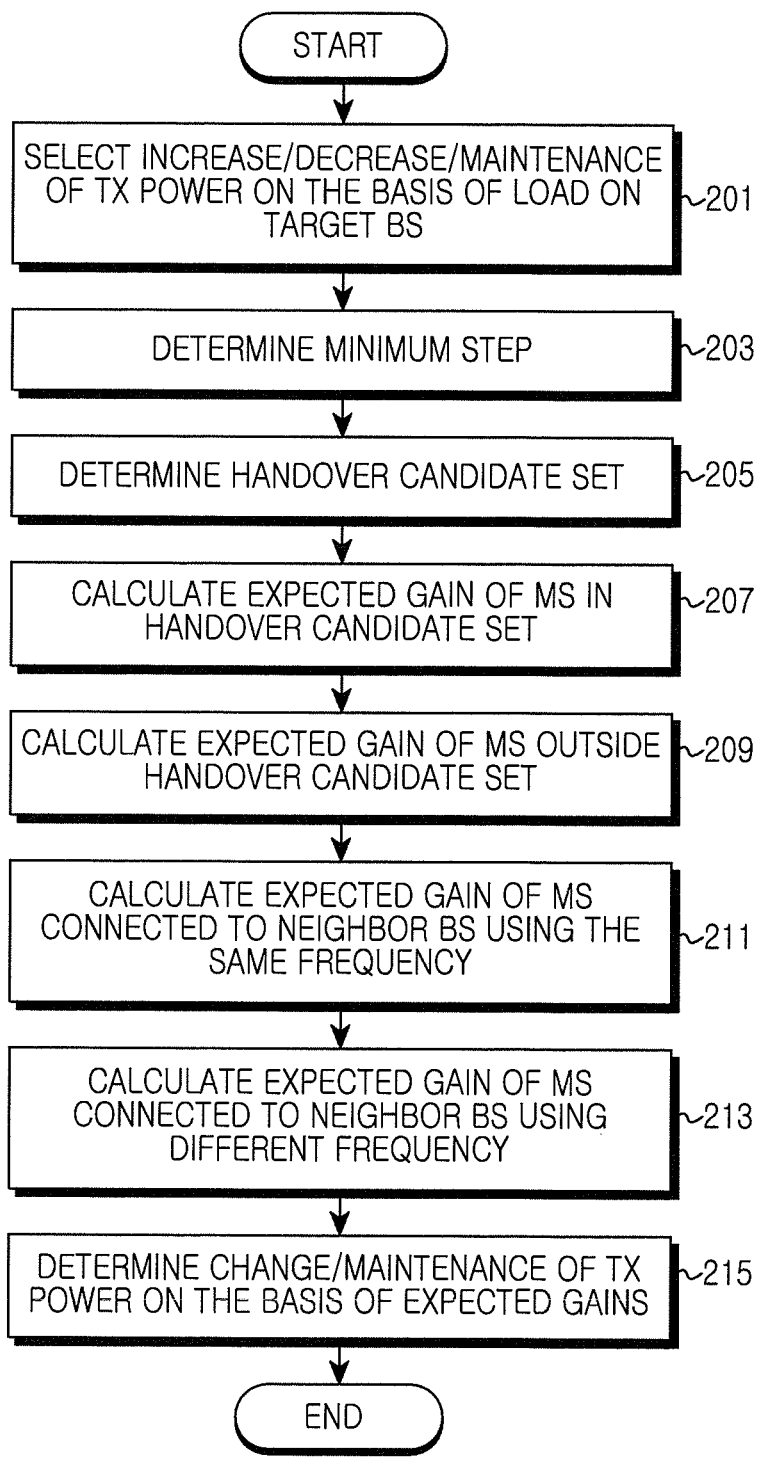
FIG. 2 illustrates an operation process of a load balancing module (LBM) in a multi-cell wireless access system according to an exemplary embodiment of the present disclosure.

FIG. 2 illustrates an operation process of a load balancing module (LBM) in a multi-cell wireless access system according to an exemplary embodiment of the present disclosure. FIG. 2 illustrates an operation process according to an exemplary embodiment for selecting and determining whether to increase or decrease a TX power based on a load on a target BS.

Referring to FIG. 2, in step 201, the LBM selects one of increase/decrease/maintenance modes of a TX power based on a load on a target BS. That is, the LBM sets a reference value based on loads on BSs and compares a load on the target BS with the reference value to select one of increase/decrease/maintenance modes of the TX power. For example, the reference value may be an average value of the loads on the BSs. If the load is larger than or equal to the reference value, the LBM selects the decrease or maintenance mode; and if the load is smaller than the reference value, the LBM selects the increase mode.

Thereafter, in step 203, the LBM determines a minimum step for the selected mode. The minimum step means an increase or decrease value of the TX power. For example, the LBM module determines required power steps necessary for a handover of MSs, and determines the minimum value among the required power steps to be the minimum step. If the selected mode is the decrease mode, the required power steps may be determined for MSs connected to the target BS. On the other hand, if the selected mode is the increase mode, the required power steps may be determined for MSs connected to a neighbor BS of the target BS. According to another exemplary embodiment, the LBM may multiply a minimum value among the required power steps by a predetermined range of integers n, detect the integer n maximizing a change in the sum of PF metrics, and determine the product of the minimum value and the detected integer n to be the minimum step. For example, if the change in the sum of the PF metrics is maximized, the difference between the values of both sides of Equation (3) is maximized. However, if the selected mode is the maintenance mode (in step 201), step 203 may be omitted.

Thereafter, in step 205, the LBM determines a handover candidate set. The handover candidate set means a set of MSs that are handed over if the TX power of the target BS is controlled by the minimum step. If the TX power is maintained, the handover candidate set means a set of MSs that are handed over regardless of the TX power. If the selected mode is the decrease or maintenance mode, the handover is a handover from the target BS to a neighbor BS; and if the selected mode is the increase mode, the handover is a handover from the neighbor BS to the target BS. If the TX power is maintained, the handover may be performed by a command of the BS. If the selected mode is the decrease mode, the LBM includes MSs, which have a required power step smaller than or equal to the minimum step among the MSs connected to the target BS, in the handover candidate set. If the selected mode is the increase mode, the LBM includes MSs, which have a required power step smaller than or equal to the minimum step among the MSs connected to neighbor BSs of the target BS, in the handover candidate set. If the selected mode is the maintenance mode, the LBM includes a predetermined number of MSs (in ascending order of the required power step) in the handover candidate set. Herein, the predetermined number may be defined as the number maximizing the gain of Equation (11), or may be defined as the number of MSs having a required power step smaller than a predetermined value.

Thereafter, in step 207, the LBM calculates an expected gain of at least one MS in the handover candidate set. Herein, the gain includes a data rate. If at least one MS in the handover candidate set is handed over by the control of the TX power or by the handover command of the BS, the LBM calculates a change in the sum of data rates of at least one MS in the handover candidate set before and after the handover. For example, if the TX power is decreased or maintained, the LBM may calculate an expected gain of at least one MS in the handover candidate set according to Equation (6). If the TX power is increased, the LBM may calculate an expected gain of at least one MS in the handover candidate set according to Equation (12).

Thereafter, in step 209, the LBM calculates an expected gain of at least one MS outside the handover candidate set. Herein, the gain includes a data rate. If at least one MS in the handover candidate set is handed over by the control of the TX power or by the handover command of the BS, the LBM calculates a change in the sum of data rates of at least one MS outside the handover candidate set before and after the handover. For example, if the TX power is decreased or maintained, the LBM may calculate an expected gain of at least one MS outside the handover candidate set according to Equation (7). If the TX power is increased, the LBM may calculate an expected gain of at least one MS outside the handover candidate set according to Equation (13).

Thereafter, in step 211, the LBM calculates an expected gain of at least one MS connected to a neighbor BS using the same frequency as a target BS. Herein, the gain includes a data rate. If at least one MS in the handover candidate set is handed over by the control of the TX power or by the handover command of the BS, the LBM calculates a change in the sum of data rates of at least one MS, connected to the neighbor BS using the same frequency, before and after the handover. For example, if the TX power is decreased or maintained, the LBM may calculate an expected gain of at least one MS, connected to the neighbor BS using the same frequency, according to Equation (8). If the TX power is increased, the LBM may calculate an expected gain of at least one MS connected to the neighbor BS using the same frequency, according to Equation (14).

Thereafter, in step 213, the LBM calculates an expected gain of at least one MS connected to a neighbor BS using a different frequency from a target BS. Herein, the gain includes a data rate. If at least one MS in the handover candidate set is handed over by the control of the TX power or by the handover command of the BS, the LBM calculates a change in the sum of data rates of at least one MS, connected to the neighbor BS using the different frequency, before and after the handover. For example, if the TX power is decreased or maintained, the LBM may calculate an expected gain of at least one MS, connected to the neighbor BS using the different frequency, according to Equation (9). If the TX power is increased, the LBM may calculate an expected gain of at least one MS, connected to the neighbor BS using the different frequency, according to Equation (15).

Thereafter, in step 215, the LBM determines whether to control the TX power in the selected mode, based on the expected gains. For example, the LBM selects a case having a relatively large gain in terms of the entire system, among a case of the selected mode and a case of no change. Herein, the case of no change means the case of maintaining the TX power and not handing over MSs. For example, the LBM may select a case where the sum of the expected gains is large. In this case, the expected gains may be summed with the same weight, or a relatively high weight may be given to a specific expected gain.

According to an exemplary embodiment, if the MS requests a handover to the BS according to the BS's own determination and performs the handover, the LBM performs step 215 and then ends the operation process. According to another exemplary embodiment, if the MS performs a handover according to the command of the BS, the LBM performs step 215, controls at least one BS to give a handover command, and then ends the operation process. If the case of no change is selected, the step of controlling at least one BS to give a handover command to at least one MS may be omitted.

Figure 3:
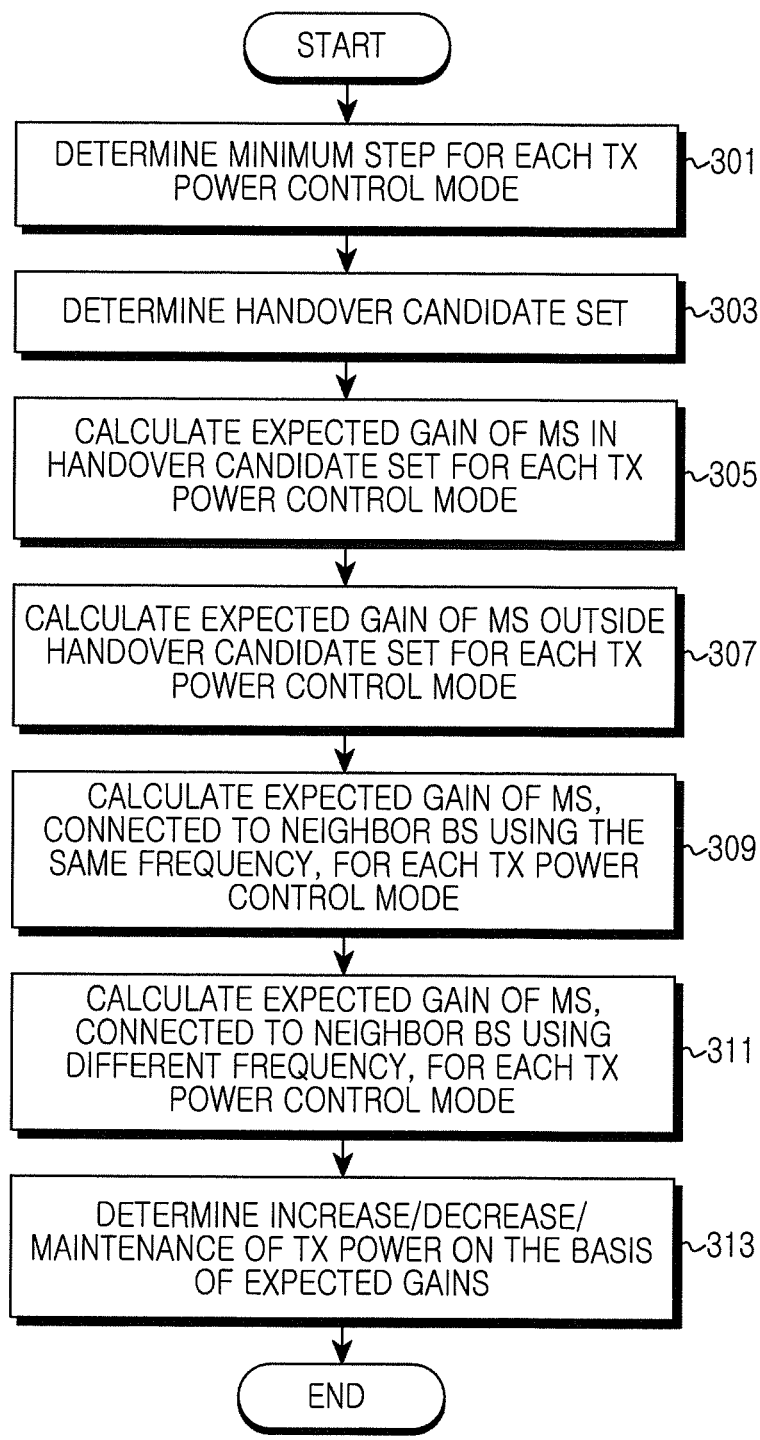
FIG. 3 illustrates an operation process of an LBM in a multi-cell wireless access system according to another exemplary embodiment of the present disclosure.

FIG. 3 illustrates an operation process of an LBM in a multi-cell wireless access system according to another exemplary embodiment of the present disclosure. FIG. 3 illustrates an operation process according to another exemplary embodiment for the example of considering all of the increase/decrease/maintenance modes of a TX power and determining the increase, decrease or maintenance mode.

Referring to FIG. 3, after selecting the increase or decrease mode, the LBM determines the minimum steps for the increase and decrease modes in step 301. The minimum step means an increase or decrease value of the TX power. For example, the LBM module determines required power steps necessary for a handover of MSs, and determines the minimum value among the required power steps to be the minimum step. When the minimum step for the decrease mode is determined, the required power steps may be determined for MSs connected to the target BS. On the other hand, when the minimum step for the increase mode is determined, the required power steps may be determined for MSs connected to a neighbor BS of the target BS. According to another exemplary embodiment, the LBM may multiply a minimum value among the required power steps by a predetermined range of integers n, detect the integer n maximizing a change in the sum, of PF metrics, and determine the product of the minimum value and the detected integer n to be the minimum step. For example, if the change in the sum of the PF metrics is maximized, the difference between the values of both sides of Equation (3) is maximized.

Thereafter, in step 303, the LBM determines handover candidate sets for the increase, decrease and maintenance modes. The handover candidate set means a set of MSs that are handed over if the TX power of the target BS is controlled by the minimum step. If the TX power is maintained, the handover candidate set means a set of MSs that are handed over regardless of the TX power. If the selected mode is the decrease or maintenance mode, the handover is a handover from the target BS to a neighbor BS; and if the selected mode is the increase mode, the handover is a handover from the neighbor BS to the target BS. If the TX power is maintained, the handover may be performed by a command of the BS. If the selected mode is the decrease mode, the LBM includes MSs, which have a required power step smaller than or equal to the minimum step among the MSs connected to the target BS, in the handover candidate set. If the selected mode is the increase mode, the LBM includes MSs, which have a required power step smaller than or equal to the minimum step among the MSs connected to neighbor BSs of the target BS, in the handover candidate set. If the selected mode is the maintenance mode, the LBM includes a predetermined number of MSs (in ascending order of the required power step) in the handover candidate set. Herein, the predetermined number may be defined as the number maximizing the gain of Equation (11), or may be defined as the number of MSs having a required power step smaller than a predetermined value.

Thereafter, in step 305, the LBM calculates an expected gain of at least one MS in the handover candidate set for each of the increase, decrease and maintenance modes. Herein, the gain includes a data rate. If at least one MS in the handover candidate set is handed over by the control of the TX power or by the handover command of the BS, the LBM calculates a change in the sum of data rates of at least one MS in the handover candidate set before and after the handover. For example, if the TX power is decreased or maintained, the LBM may calculate an expected gain of at least one MS in the handover candidate set according to Equation (6). If the TX power is increased, the LBM may calculate an expected gain of at least one MS in the handover candidate set according to Equation (12).

Thereafter, in step 307, the LBM calculates an expected gain of at least one MS outside the handover candidate set for each of the increase, decrease and maintenance modes. Herein, the gain includes a data rate. If at least one MS in the handover candidate set is handed over by the control of the TX power or by the handover command of the BS, the LBM calculates a change in the sum of data rates of at least one MS outside the handover candidate set before and after the handover. For example, if the TX power is decreased or maintained, the LBM may calculate an expected gain of at least one MS outside the handover candidate set according to Equation (7). If the TX power is increased, the LBM may calculate an expected gain of at least one MS outside the handover candidate set according to Equation (13).

Thereafter, in step 309, the LBM calculates an expected gain of at least one MS, connected to a neighbor BS using the same frequency as a target BS, for each of the increase, decrease and maintenance modes. Herein, the gain includes a data rate. If at least one MS in the handover candidate set is handed over by the control of the TX power or by the handover command of the BS, the LBM calculates a change in the sum of data rates of at least one MS, connected to the neighbor BS using the same frequency, before and after the handover. For example, if the TX power is decreased or maintained, the LBM may calculate an expected gain of at least one MS, connected to the neighbor BS using the same frequency, according to Equation (8). If the TX power is increased, the LBM may calculate an expected gain of at least one MS connected to the neighbor BS using the same frequency, according to Equation (14).

Thereafter, in step 311, the LBM calculates an expected gain of at least one MS, connected to a neighbor BS using a different frequency from a target BS, for each of the increase, decrease and maintenance modes. Herein, the gain includes a data rate. If at least one MS in the handover candidate set is handed over by the control of the TX power or by the handover command of the BS, the LBM calculates a change in the sum of data rates of at least one MS, connected to the neighbor BS using the different frequency, before and after the handover. For example, if the TX power is decreased or maintained, the LBM may calculate an expected gain of at least one MS, connected to the neighbor BS using the different frequency, according to Equation (9). If the TX power is increased, the LBM may calculate an expected gain of at least one MS, connected to the neighbor BS using the different frequency, according to Equation (15).

Thereafter, in step 313, the LBM determines whether to control the TX power in the selected mode, based on the expected gains. That is, the LBM selects one of the increase mode, the decrease mode and the maintenance mode. For example, the LBM selects the case having a relatively large gain in terms of the entire system, among the cases of the increase, decrease and maintenance modes. For example, the LBM may select the case where the sum of the expected gains is large. In this case, the expected gains may be summed with the same weight, or a relatively high weight may be given to a specific expected gain. However, if the gain of the increase, decrease and maintenance modes is smaller than the gain of the case of no change, that is, the case of not performing the handover and not increasing/decreasing the TX power, the LBM may not select any one of the increase mode, the decrease mode and the maintenance mode.

According to an exemplary embodiment, if the MS requests a handover to the BS according to the BS's own determination and performs the handover, the LBM performs step 313 and then ends the operation process. According to another exemplary embodiment, if the MS performs a handover according to the command of the BS, the LBM performs step 313, controls at least one BS to give a handover command, and then ends the operation process. If the case of no change is selected, the step of controlling at least one BS to give a handover command to at least one MS may be omitted.

Figure 4:
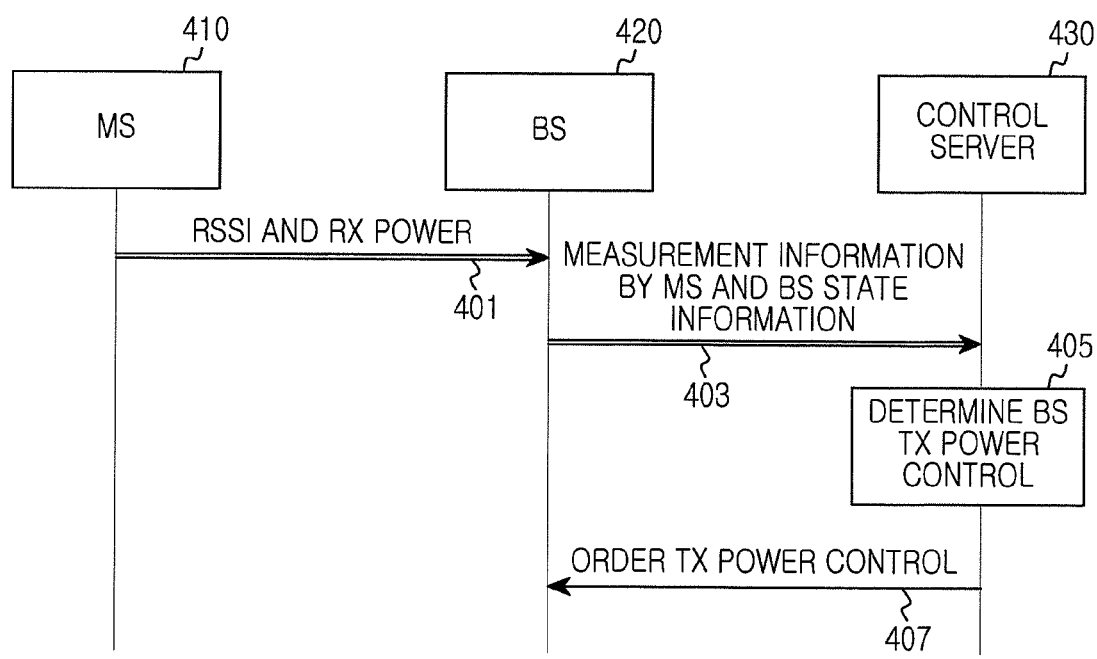
FIG. 4 illustrates a load balancing process in a multi-cell wireless access system according to an exemplary embodiment of the present disclosure.

FIG. 4 illustrates a load balancing process in a multi-cell wireless access system according to an exemplary embodiment of the present disclosure. FIG. 4 illustrates a load balancing process according to an exemplary embodiment where a control server determines the TX power of a target BS and an MS feeds back the MS's measurement information. Although FIG. 4 illustrates one MS and one BS, the present disclosure is also applicable to embodiments where there are a plurality of MSs and a plurality of BSs.

Referring to FIG. 4, an MS 410 reports an RSSI and a received (RX) power to a BS 420 in step 401. The BS 420 is a serving BS of the MS 410, and the RSSI and the RX power are measured values for a neighbor BS receiving a signal stronger than a threshold value. For example, the threshold value may be the strength of a thermal noise. The RSSI and the RX power are periodically reported at regular intervals.

In step 403, the BS 420 provides a control server 430 with state information of the BS 420 and measurement information reported from the MS 410. The state information includes the current power of the BS 420 and the number of MSs connected to the BS 420.

In step 405, the control server 430 determines whether to control the TX power of the BS 420. That is, the control server 430 determines a TX power control mode and whether to control the TX power of the BS 420 according to the process illustrated in FIG. 2 or 3. At this point, the control server 430 uses information received from the BS 420 and information received from a neighbor BS of the BS 420. Herein, it is assumed that the increase or decrease mode of the TX power is determined.

In step 407, the control server 430 gives a TX power control command to the BS 420 according to the determination made in step 405. Accordingly, the BS 420 changes the TX power. Also, at least one MS connected to the BS 420 confirms that the TX power is changed, and may perform a handover according to changing the TX power.

Figure 5:
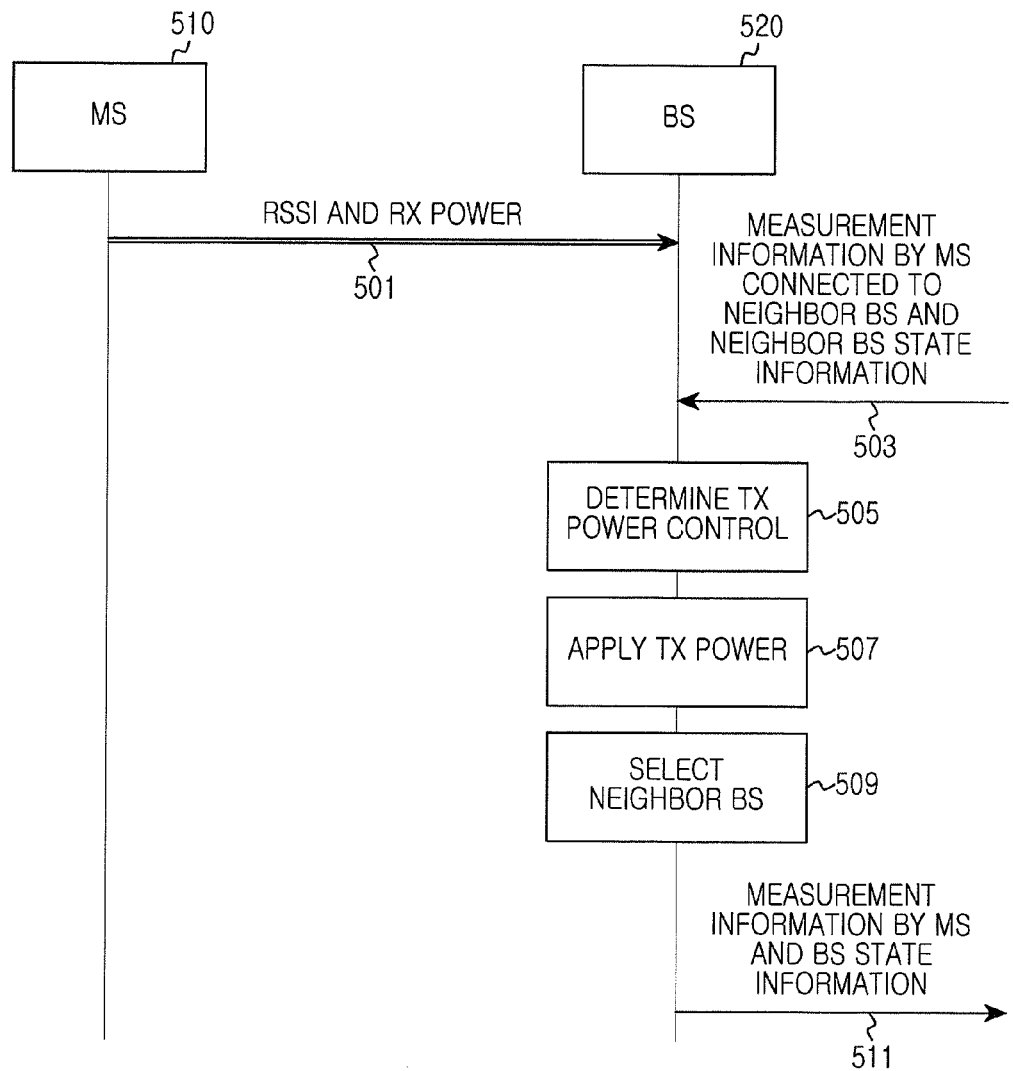
FIG. 5 illustrates a load balancing process in a multi-cell wireless access system according to another exemplary embodiment of the present disclosure.

FIG. 5 illustrates a load balancing process in a multi-cell wireless access system according to another exemplary embodiment of the present disclosure. FIG. 5 illustrates a load balancing process according to another exemplary embodiment where a target BS directly determines the target BS's TX power and an MS feeds back the MS's measurement information. Although FIG. 5 illustrates one MS and one BS, the present disclosure is also applicable to embodiments where there are a plurality of MSs and a plurality of BSs.

Referring to FIG. 5, an MS 510 reports an RSSI and a received (RX) power to a BS 520 in step 501. The BS 520 is a serving BS of the MS 510, and the RSSI and the RX power are measured values for a neighbor BS receiving a signal stronger than a threshold value. For example, the threshold value may be the strength of a thermal noise. The RSSI and the RX power are periodically reported at regular intervals.

In step 503, the BS 520 receives, from neighbor BSs, state information of the neighbor BSs and measurement information by MSs connected respectively to the neighbor BSs. The measurement information includes an RSSI and an RX power of neighbor BSs of the neighbor BS measured by the MS connected to the neighbor BS. The station information includes the current power of the neighbor BS and the number of MSs connected to the neighbor BS.

In step 505, the BS 520 determines whether to control the TX power of the BS 520. That is, the BS 520 determines a TX power control mode and whether to control the TX power of the BS 520 according to the process illustrated in FIG. 2 or 3. At this point, the BS 520 uses information received from the MS 510 and information received from the neighbor BSs.

In step 507, the BS 520 controls or maintains the TX power according to the determination made in step 505. Accordingly, at least one MS connected to the BS 520 confirms that the TX power is changed, and may perform a handover according to changing the TX power.

In step 509, the BS 520 selects n number of neighbor BSs. According to an exemplary embodiment, the BS 520 selects n number of neighbor BSs having the strongest RX signal. According to another exemplary embodiment, the BS 520 selects n number of neighbor BSs having the strongest RX signal among the RX signals from neighbor BSs measured by upper MSs measuring the strongest RX signal. According to another exemplary embodiment, the BS 520 selects n number of neighbor BSs having the strongest RX signal expected based on path loss model. According to another exemplary embodiment, the BS 520 selects n number of neighbor BSs that are nearest to the BS 520. According to another exemplary embodiment, the BS 520 selects n number of neighbor BSs that have a high frequency of occurrence of a handover. The n neighbor BSs may be selected regardless of the frequency used by each BS.

In step 511, the BS 520 provides the neighbor BSs with state information of the BS 520 and measurement information by the MSs connected to the BS 520. The measurement information includes an RSSI and an RX power for the neighbor BSs of the BS 520 measured by the MS connected to the BS 520. The state information includes the current power of the BS 520 and the number of MSs connected to the BS 520.

Figure 6:
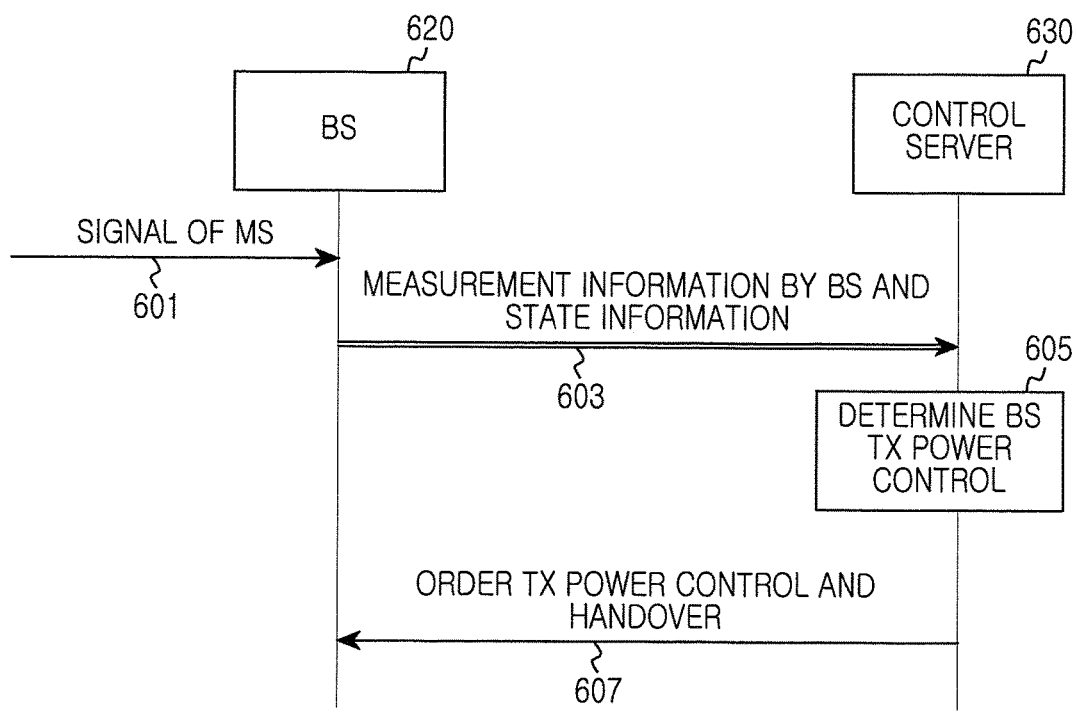
FIG. 6 illustrates a load balancing process in a multi-cell wireless access system according to another exemplary embodiment of the present disclosure.

FIG. 6 illustrates a load balancing process in a multi-cell wireless access system according to another exemplary embodiment of the present disclosure. FIG. 6 illustrates a load balancing process according to another exemplary embodiment where a control server determines the TX power of a target BS and the BS measures a signal received from an MS. Although FIG. 6 illustrates one MS and one BS, the present disclosure is also applicable to embodiments where there are a plurality of MSs and a plurality of BSs.

Referring to FIG. 6, in step 601, a BS 620 measures an RSSI and an RX power of at least one MS by using a signal received from the at least one MS. For example, the signal received from the at least one MS may be a Sounding Reference Signal (SRS). The at least one MS may include not only an MS connected to the BS 620, but also an MS connected to a neighbor BS of the BS 620. The RSSI and the RX power are measured values for an MS receiving a signal stronger than a threshold value. For example, the threshold value may be the strength of a thermal noise. The RSSI and the RX power may be periodically averaged at regular intervals.

In step 603, the BS 620 provides a control server 630 with the measurement information by the BS 620 and state information of the BS 620. The state information includes the current power of the BS 620 and the number of MSs connected to the BS 620.

In step 605, the control server 630 determines whether to control the TX power of the BS 620. That is, the control server 630 determines a TX power control mode and whether to control the TX power of the BS 620 according to the process illustrated in FIG. 2 or 3. At this point, the control server 630 uses information received from the BS 620 and information received from a neighbor BS of the BS 620. Herein, it is assumed that the increase or decrease mode of the TX power is determined.

In step 607, the control server 630 gives a TX power control command to the BS 620 according to the determination made in step 605. In addition, the control server 630 may order the BS 620 to give a handover command to at least one MS. Accordingly, at least one MS connected to the BS 620 confirms the handover command, and may perform a handover according to the handover command.

Figure 7:
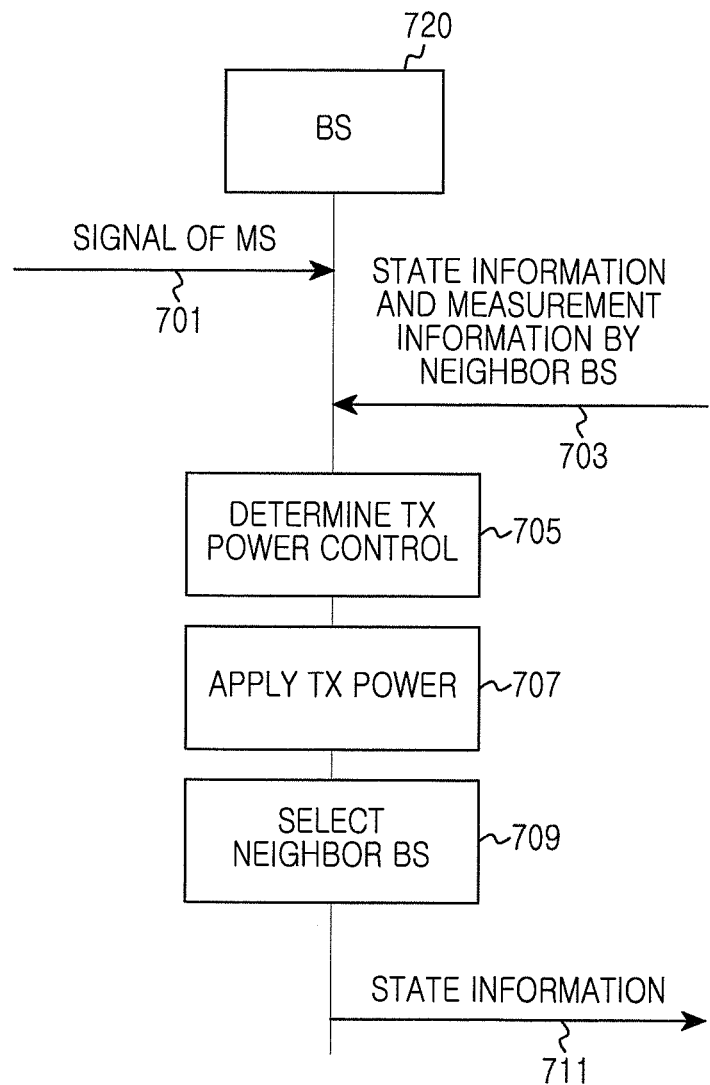
FIG. 7 illustrates a load balancing process in a multi-cell wireless access system according to another exemplary embodiment of the present disclosure.

FIG. 7 illustrates a load balancing process in a multi-cell wireless access system according to another exemplary embodiment of the present disclosure. FIG. 7 illustrates a load balancing process according to another exemplary embodiment where a target BS directly determines the target BS's TX power and the BS measures a signal received from an MS. Although FIG. 7 illustrates one MS and one BS, the present disclosure is also applicable to embodiments where there are a plurality of MSs and a plurality of BSs.

Referring to FIG. 7, in step 701, a BS 720 measures an RSSI and an RX power of at least one MS by using a signal received from the at least one MS. For example, the signal received from the at least one MS may be a Sounding Reference Signal (SRS). The at least one MS may include not only an MS connected to the BS 720, but also an MS connected to a neighbor BS of the BS 720. The RSSI and the RX power are measured values for an MS receiving a signal stronger than a threshold value. For example, the threshold value may be the strength of a thermal noise. The RSSI and the RX power may be periodically averaged at regular intervals.

In step 703, the BS 720 receives, from neighbor BSs, state information of the neighbor BSs and measurement information of MSs measured by the neighbor BSs, that is, an RSSI and an RX power. The measurement information includes measurement information of an MS connected to the neighbor BS and measurement information of an MS connected to a neighbor BS of the neighbor BS. The state information includes the current power of the neighbor BS and the number of MSs connected to the neighbor BS.

In step 705, the BS 720 determines whether to control the TX power of the BS 720. That is, the BS 720 determines a TX power control mode and whether to control the TX power of the BS 720 according to the process illustrated in FIG. 2 or 3. At this point, the BS 720 uses information received from the MS 710 and information received from the neighbor BSs.

In step 707, the BS 720 increases, decreases or maintains the TX power according to the determination made in step 705. In addition, the BS 720 may give a handover command to at least one MS. Accordingly, at least one MS connected to the BS 720 confirms the handover command, and may perform a handover according to the handover command.

In step 709, the BS 720 selects n number of neighbor BSs. According to an exemplary embodiment, the BS 720 selects n number of neighbor BSs having the strongest RX signal. According to another exemplary embodiment, the BS 720 selects n number of neighbor BSs having the strongest RX signal among the RX signals from neighbor BSs measured by upper MSs measuring the strongest RX signal. According to another exemplary embodiment, the BS 720 selects n number of neighbor BSs having the strongest RX signal expected based on path loss model. According to another exemplary embodiment, the BS 720 selects n number of neighbor BSs that are nearest to the BS 720. According to another exemplary embodiment, the BS 720 selects n number of neighbor BSs that have a high frequency of occurrence of a handover. The n neighbor BSs may be selected regardless of the frequency used by each BS.

In step 711, the BS 720 provides state information of the BS 720 to the neighbor BSs. The state information includes the current power of the BS 720 and the number of MSs connected to the BS 720.

Figure 8:
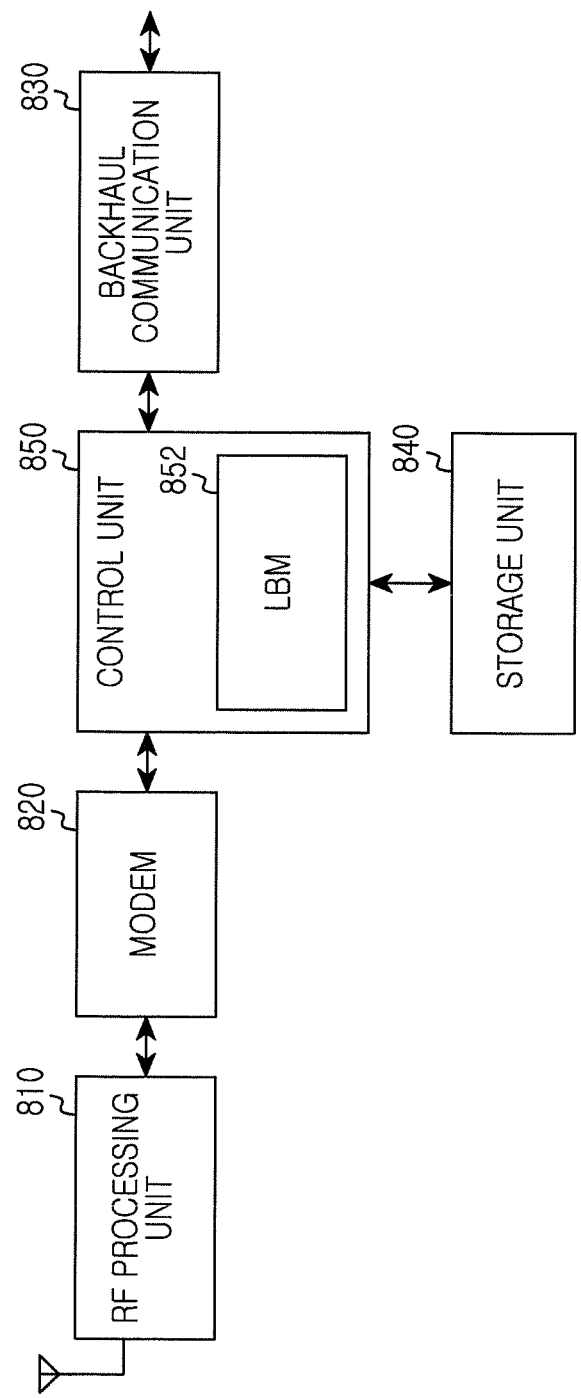
FIG. 8 illustrates a base station (BS) in a multi-cell wireless access system according to an exemplary embodiment of the present disclosure.

FIG. 8 illustrates a BS in a multi-cell wireless access system according to an exemplary embodiment of the present disclosure.

Referring to FIG. 8, the BS may include a radio frequency (RF) processing unit 810, a modem 820, a backhaul communication unit 830, a storage unit 840, and a control unit 850.

The RF processing unit 810 performs functions (e.g., signal band conversion and amplification) for communicating signals through a wireless channel. That is, the RF processing unit 810 up-converts a baseband signal, received from the modem 820, into an RF signal, and transmits the RF signal through an antenna. Also, the RF processing unit 810 down-converts a RF signal, received through the antenna, into a baseband signal. For example, the RF processing unit 810 may include an amplifier, a mixer, an oscillator, a digital-to-analog converter (DAC), and an analog-to-digital converter (ADC).

The modem 820 performs conversion between a baseband signal and a bit string according to the physical layer standard of the system. For example, according to an OFDM (Orthogonal Frequency Division Multiplexing) scheme, in a data transmitting mode, the modem 820 encodes/modulates a TX bit string to generate complex symbols, maps the complex symbols to subcarriers, and generates OFDM symbols by IFFT (Inverse Fast Fourier Transform) operation and CP (cyclic prefix) insertion. Also, in a data receiving mode, the modem 820 divides a baseband signal, received from the RF processing unit 810, into OFDM symbols, restores signals mapped to subcarriers by FFT operation, and restores an RX bit string by demodulation and decoding.

The storage unit 830 stores a basic program for an operation of the BS, and data such as TX/RX traffic. The storage unit 830 provides data stored at the request of the control unit 850. In particular, the storage unit 830 stores measurement information measured by the BS or reported from MSs connected to the BS, stores measurement information measured by neighbor BSs or provided from the neighbor BSs, and stores state information of the neighbor BSs. The measurement information includes an RSSI or an RX power from BS to MS or from MS to BS. The state information includes the current TX power and the number of MSs connected.

The backhaul communication unit 840 provides an interface for allowing the BS to communicate with another node (e.g., a control server) in the network. That is, the backhaul communication unit 840 converts a bit string, transmitted from the BS to the other node, into a physical signal, and converts a physical signal, received from the other node, into a bit string.

The control unit 850 controls an overall operation of the BS. For example, the control unit 850 generates TX traffic packets and messages and provides the same to the modem 820. Also, the control unit 850 interprets RX traffic packets and messages received from the modem 820.

In particular, the control unit 850 performs an information collection operation for load balancing. That is, the control unit 850 collects an RSSI and an RX power of neighbor BSs reported from MSs connected to the BS. In this example, the MSs measure an RSSI and an RX power for neighbor BSs receiving a signal stronger than a threshold value. For example, the threshold value may be the strength of a thermal noise.

If load balancing is performed in a centralized manner, the control unit 850 provides state information of the BS and measurement information, reported from MSs, through the backhaul communication unit 830 to the control server. On the other hand, if load balancing is performed in a distributed manner, the control unit 850 provides at least one of state information of the BS and measurement information, reported from MSs, through the backhaul communication unit 830 to n number of neighbor BSs, and receives at least one of state information of the neighbor BSs and measurement information of MSs, connected to the neighbor BSs, from the neighbor BSs. Herein, the n neighbor BSs are determined by the selection of the control unit 850. According to an exemplary embodiment, the control unit 850 selects n number of neighbor BSs having the strongest RX signal. According to another exemplary embodiment, the control unit 850 selects n number of neighbor BSs having the strongest RX signal among the RX signals from neighbor BSs measured by upper MSs measuring the strongest RX signal. According to another exemplary embodiment, the control unit 850 selects n number of neighbor BSs having the strongest RX signal expected based on path loss model. According to another exemplary embodiment, the control unit 850 selects n number of neighbor BSs that are nearest to the BS. According to another exemplary embodiment, the control unit 850 selects n number of neighbor BSs that have a high frequency of occurrence of a handover. The n neighbor BSs may be selected regardless of the frequency used by each BS.

A load balancing module (LBM) 852 in the control unit 850 determines a TX power of the BS according to a load balancing process. If the load balancing is performed in a distributed manner, the LBM 852 may be included in the BS; and if the load balancing is performed in a centralized manner, the LBM 852 may not be included in the BS. That is, the LBM 852 may be included in the BS only if the load balancing is performed in a distributed manner. The LBM 852 may determine a TX power of the BS according to the operation process of FIG. 2 or 3. The operation of the LBM 852 will be described below in detail.

The LBM 852 determines a minimum step that is a change value of the TX power. The minimum step is the minimum value among the required power steps for a handover of an MS. In the example of a TX power increase mode, the minimum step is determined based on MSs connected to a neighbor BS. In the example of a TX power decrease mode, the minimum step is determined based on MSs connected to a target BS. Herein, the minimum step may be determined to be 0. When the minimum step is determined, the LBM 852 classifies MSs; calculates a gain change before/after the TX power control for each classification, that is, expected gains after the TX power control; and determines whether to control the TX power based on the expected gains. Herein, the classification includes at least one of at least one of an MS group to be handed over by the TX power control, that is, an MS group belonging, to a handover candidate set, an MS group not belonging to the handover candidate set among the MSs connected to a target BS, an MS group connected to a neighbor BS using the same frequency, and an MS group connected to a neighbor BS using a different frequency. For example, the expected gains may be calculated according to Equations (6) to (9) and Equations (12) to (15).

The determination of whether to control the TX power may be performed after the selection of a control mode, or may be selected for the largest gain after consideration of all the modes. According to an exemplary embodiment, the LBM 852 selects one of the TX power increasing/decreasing/maintaining modes according to a load amount of a target BS, calculates expected gains of the example according to the selected mode, and determines TX power control or no change based on the expected gains. According to another exemplary embodiment, the LBM 852 calculates expected gains for each of the TX power increasing/decreasing/maintaining modes, and determines one of no change and the TX power increasing/decreasing/maintaining modes based on the expected gains.

Figure 9:
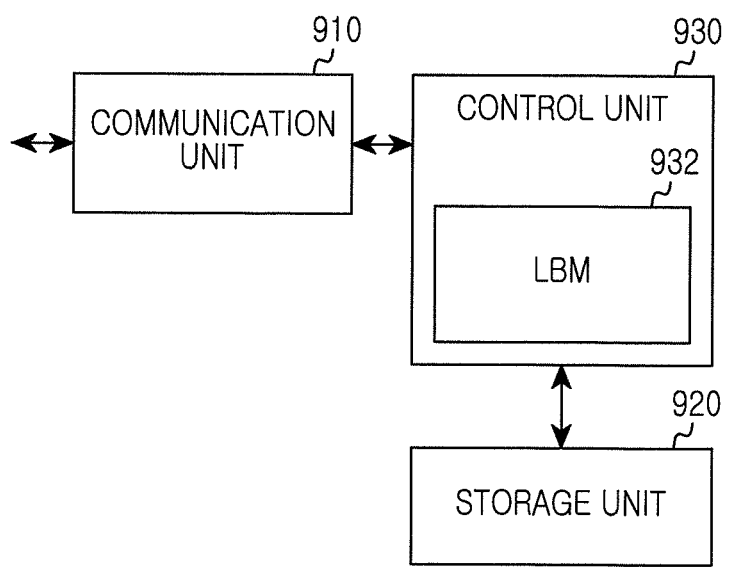
FIG. 9 illustrates a control server in a multi-cell wireless access system according to an exemplary embodiment of the present disclosure.

FIG. 9 illustrates a control server in a multi-cell wireless access system according to an exemplary embodiment of the present disclosure.

Referring to FIG. 9, the control server may include a communication unit 910, a storage unit 920, and a control unit 930.

The communication unit 910 provides an interface for allowing the control server to communicate with another node in the network. That is, the communication unit 910 converts a bit string, transmitted from the control server to the other node, into a physical signal, and converts a physical signal, received from the other node, into a bit string.

The storage unit 920 stores a basic program for an operation of the control server, and data such as setting information. The storage unit 920 provides data stored at the request of the control unit 930. For example, the storage unit 920 stores measurement information measured by BSs or reported from an MS connected to the BSs, and stores state information of the BSs. The measurement information includes an RSSI or an RX power from BS to MS or from MS to BS. The state information includes the current TX power and the number of MSs connected to the relevant BS.

The control unit 930 controls an overall operation of the control server. In particular, the control unit 930 performs a TX power determining operation and an information collecting operation for load balancing. That is, the control unit 930 collects state information of BSs and measurement information of an MSs. A load balancing module (LBM) 932 in the control unit 930 determines a TX power of each BS according to a load balancing process. That is, the LBM 932 may determine a TX power of the BS according to the operation process of FIG. 2 or 3. The operation of the LBM 932 will be described below in detail.

The LBM 932 determines a minimum step that is a change value of the TX power. The minimum step is the minimum value among the required power steps for a handover of an MS. In the example of a TX power increase mode, the minimum step is determined based on MSs connected to a neighbor BS. In the example of a TX power decrease mode, the minimum step is determined based on MSs connected to a target BS. Herein, the minimum step may be determined to be 0. When the minimum step is determined, the LBM 932 classifies MSs; calculates a gain change before/after the TX power control for each classification, that is, expected gains after the TX power control; and determines whether to control the TX power based on the expected gains. Herein, the classification includes at least one of at least one of an MS group to be handed over by the TX power control, that is, an MS group belonging to a handover candidate set, an MS group not belonging to the handover candidate set among the MSs connected to a target BS, an MS group connected to a neighbor BS using the same frequency, and an MS group connected to a neighbor BS using a different frequency. For example, the expected gains may be calculated according to Equations (6) to (9) and Equations (12) to (15).

The determination of whether to control the TX power may be performed after the selection of a control mode, or may be selected for the largest gain after consideration of all the modes. According to an exemplary embodiment, the LBM 932 selects one of the TX power increasing/decreasing/maintaining modes according to a load amount of a target BS, calculates expected gains of the example according to the selected mode, and determines TX power control or no change based on the expected gains. According to another exemplary embodiment, the LBM 932 calculates expected gains for each of the TX power increasing/decreasing/maintaining modes, and determines one of no change and the TX power increasing/decreasing/maintaining modes based on the expected gains.

Figure 10:
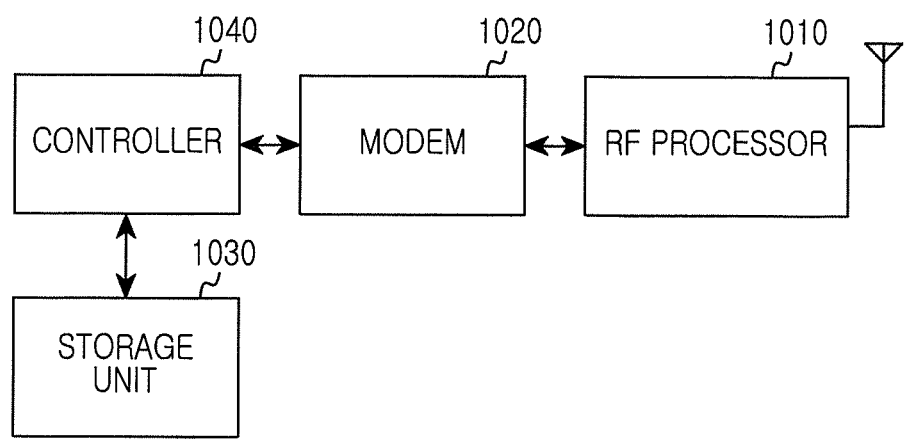
FIG. 10 illustrates a mobile station (MS) in a multi-cell wireless access system according to an exemplary embodiment of the present disclosure.

FIG. 10 illustrates an MS in a multi-cell wireless access system according to an exemplary embodiment of the present disclosure.

Referring to FIG. 10, a BS includes an RF processor 1010, a modem 1020, a storage unit 1030, and a controller 1040.

The RF processor 1010 performs functions related to transmitting and receiving a signal through a radio channel, such as signal band conversion, amplification, or the like. The RF processor 1010 up-converts a baseband signal provided from the modem 1020 into an RF band signal and then transmits the RF band signal through an antenna, and down-converts the RF band signal received through the antenna into a baseband signal.

The modem 1020 converts the baseband signal to/from a bit-stream according to a physical layer protocol of the system. In data transmission, the modem 1020 generates complex symbols by performing coding and modulation on a Tx bit-stream, maps the complex symbols to subcarriers, and configures OFDM symbols by performing an IFFT operation and inserting a CP. In data reception, the modem 1020 divides the baseband signal provided from the RF processor 1010 in an OFDM symbol unit, restores signals mapped to subcarriers by performing an FFT operation, and then restores an Rx bit-stream by performing demodulation and decoding. The modem 1020 determines whether a TX power of a BS is changed or whether a handover command from the BS is received.

The storage unit 1030 stores data such as a basic program for operating the MS, an application program, setting information and so on. The storage unit 1030 provides the stored data at the request of the controller 1040.

The controller 1040 provides overall control. For example, the controller 1040 configures downlink data and provides the data to the modem 1020, and interprets uplink data provided from the modem 1020. The controller 1040 also controls to perform a handover according to a changing a TX power of a BS or a handover command from the BS.

As described above, the present disclosure controls the TX power of the BS in the multi-cell wireless access system to provide inter-cell load balancing, thereby making it possible to increase the total system efficiency.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for load balancing in a multi-cell wireless access system, the method comprising:
    determining a mode that corresponds to at least one of increasing, decreasing, or maintaining a transmission (TX) power for a base station (BS) based on a load for the BS;
    determining a change value for the TX power based on the determined mode, wherein determining the change value for the TX power comprise:
    determining required power values needed for a handover of a plurality of mobile stations (MSs), and
    identifying a minimum value among the required power values as the change value;
    determining at least one MS among the plurality of MSs based on the change value;
    determining expected data rate gains of the plurality of MSs; and
    controlling the TX power based on the expected data rate gains, wherein the expected data rate gains comprise an expected data rate gain of the at least one MS and expected data rate gains of remaining MSs of the plurality of MSs excluding the at least one MS, which are expected to be obtained if the at least one MS performs a handover based on the TX power controlled by the change value.

2. The method of claim 1, wherein determining the required power values comprises:
    if the TX power is to be decreased, determining the required power values based on MSs connected to the BS; and
    if the TX power is to be increased, determining the required power values based on MSs connected to a neighbor BS of the BS.

3. The method of claim 1, wherein the at least one MS includes MSs including a required power value less than or equal to the change value of the TX power.

4. The method of claim 1, wherein the at least one MS includes a predetermined number of MSs in ascending order of a required power value needed for a handover of an MS.

5. The method of claim 1, wherein the determining the expected data rate gains of the plurality of MSs comprising determining expected data rate gains of the at least one MS, an MS group not belonging to the at least one MS among MSs connected to the BS, an MS group connected to a neighbor BS using a same frequency, or an MS group connected to a neighbor BS using a different frequency.

6. The method of claim 1, wherein the expected data rate gains are a change in a sum of date rates before and after the handover.

7. The method of claim 1, wherein controlling the TX power comprises controlling the TX power by selecting a case corresponding to a largest sum of expected data rate gains from a group of cases that includes at least one of a first sum of expected data rate gains in a case of increasing the TX power, a second sum of expected data rate gains in a case of decreasing the TX power, or a third sum of expected data rate gains in a case of maintaining the TX power.

8. The method of claim 1, wherein a TX power mode for the TX power includes at least two of modes selected from a group of modes including at least one of increasing, decreasing, or maintaining the TX power.

9. The method of claim 8, wherein controlling the TX power comprises controlling the TX power by selecting a case corresponding to a largest sum of expected data rate gains from a group of cases including at least one of a first sum of expected data rate gains in a case of controlling the TX power according to a selected TX power mode or a second sum of expected data rate gains in a case of maintaining the TX power without a handover of the at least one MS.

10. The method of claim 1 further comprising acquiring measurement information of MSs and state information of base stations (BSs).

11. The method of claim 10, wherein the measurement information includes at least one of a received (RX) power of at least one BS measured by the MSs, a received signal strength indicator (RSSI) of the at least one BS measured by the MSs, an RX power of the MSs measured by the at least one BS, or an RSSI of the MSs measured by the at least one BS, and
wherein the state information includes at least one of a current TX power of the at least one BS or a number of MSs connected to the at least one BS.

12. An apparatus for load balancing in a multi-cell wireless access system, the apparatus comprising:
a memory configured to store state information of base stations (BSs) and measurement information of mobile stations (MSs) used for load balancing; and
a controller configured to:
determine a mode that corresponds to at least one of increasing, decreasing, or maintaining a transmission (TX) power for a BS based on a load for the BS;
determine a change value for the TX power based on the determined mode, wherein the controller is further configured to:
determine required power values needed for a handover of a plurality of MSs, and
identify a minimum value among the required power values as the change value;
determine at least one MS among the plurality of MSs based on the change value;
determine expected data rate gains of the plurality of MSs; and
control the TX power based on the expected data rate gains, wherein the expected data rate gains comprise an expected data rate gain of the at least one MS and expected data rate gains of remaining MSs of the plurality of MSs excluding the at least one MS, which are expected to be obtained if the at least one MS performs a handover based on the TX power controlled by the change value.

13. The apparatus of claim 12, wherein:
if the TX power is to be decreased, the controller is further configured to determine the required power values based on MSs connected to the BS; and
if the TX power is to be increased, the controller is further configured to determine the required power values based on MSs connected to a neighbor BS of the BS.

14. The apparatus of claim 12, wherein the at least one MS includes MSs including a required power value less than or equal to the change value of the TX power.

15. The apparatus of claim 12, wherein the at least one MS includes a predetermined number of MSs in ascending order of a required power value needed for a handover of an MS.

16. The apparatus of claim 12, wherein the controller is configured to determine expected data rate gains of the at least one MS, an MS group not belonging to the at least one MS among MSs connected to the BS, an MS group connected to a neighbor BS using a same frequency, or an MS group connected to a neighbor BS using a different frequency.

17. The apparatus of claim 12, wherein the expected data rate gains are a change in a sum of date rates before and after the handover.

18. The apparatus of claim 12, wherein the controller is configured to control the TX power by selecting a case corresponding to a largest sum of expected data rate gains from a group of cases including at least one of a first sum of expected data rate gains in a case of increasing the TX power, a second sum of expected data rate gains in a case of decreasing the TX power, or a third sum of expected data rate gains in a case of maintaining the TX power.

19. The apparatus of claim 12, wherein a TX power mode for the TX power includes at least two of modes selected from a group of modes including at least one of increasing, decreasing, or maintaining the TX power.

20. The apparatus of claim 19, wherein the controller is configured to control the TX power by selecting a case corresponding to a largest sum of expected data rate gains from a group of cases including at least one of a first sum of expected data rate gains in a case of controlling the TX power according to a selected TX power mode or a second sum of expected data rate gains in a case of maintaining the TX power without a handover of the at least one MS.

21. The apparatus of claim 12, wherein the controller is further configured to acquire measurement information of MSs and state information of BSs.

22. The apparatus of claim 21, wherein the measurement information includes at least one of a received (RX) power of at least one BS measured by the MSs, a received signal strength indicator (RSSI) of the at least one BS measured by the MSs, an RX power of the MSs measured by the at least one BS, or an RSSI of the MSs measured by the at least one BS, and
wherein the state information includes a current TX power of the at least one BS and a number of MSs connected to the at least one BS.

23. A method for an operation of a mobile station (MS) in a multi-cell wireless access system, the method comprising:
    detecting at least one of a change of a transmission (TX) power for a base station (BS) or a reception of a handover command transmitted from the BS; and
    performing a handover according to at least one of the change of the TX power for the BS or the handover command transmitted from the BS,
    wherein the changing of the TX power of the BS or transmitting the handover command is determined based on expected data rate gains determined by determining a mode that corresponds to at least one of increasing, decreasing, or maintaining a TX power for a BS based on a load for the BS, and determining a change value for the TX power based on the determined mode, wherein determining the change value for the TX power comprise: determining required power values needed for a handover of a plurality of MSs and identifying a minimum value among the required power values as the change value, and
    wherein the expected data rate gains comprise an expected data rate gain of the at least one MS and expected data rate gains of remaining MSs of the plurality of MSs excluding the at least one MS, which are expected to be obtained if the at least one MS performs a handover based on the TX power controlled by the change value.

24. An apparatus for a mobile station (MS) in a multi-cell wireless access system, the apparatus comprising:
    a modem configured to detect at least one of a change of a transmission (TX) power for a base station (BS) or a reception of a handover command transmitted from the BS; and
    a controller configured to perform a handover according to at least one of a change of the TX power for the BS or the handover command transmitted from the BS,
    wherein the change of the TX power of the B S or transmission of the handover command is determined based on expected data rate gains determined by determining a mode that corresponds to at least one of increasing, decreasing, or maintaining a TX power for a BS based on a load for the BS, and determining a change value for the TX power based on the determined mode, wherein determining the change value for the TX power comprises determining required power values needed for a handover of a plurality of MSs and identifying a minimum value among the required power values as the change value, and
wherein the expected data rate gains comprise an expected data rate gain of the at least one MS and expected data rate gains of remaining MSs of the plurality of MSs excluding the at least one MS, which are expected to be obtained if the at least one MS performs a handover based on the TX power controlled by the change value.

* * * * *